United States Patent Office

2,900,421
Patented Aug. 18, 1959

2,900,421

INHIBITING POLYMERIZATION

Morris S. Kharasch, Chicago, Ill., and Walter Nudenberg, Cedar Grove, N.J.

No Drawing. Application February 6, 1957
Serial No. 638,427

12 Claims. (Cl. 260—652.5)

This invention relates to the inhibition of undesired polymerization of polymerizable olefinically unsaturated monomers such as styrene, vinyltoluene, 2-chloro-butadiene-1,3, butadiene 1,3, isoprene, etc.

This application is a continuation-in-part of our application Serial No. 503,332, filed on April 22, 1955, and now abandoned.

In the handling, storage and fractional distillation of polymerizable olefinically unsaturated monomers spontaneous polymerization often occurs. This polymerization may take the form of self-polymerization to form either a clear, solid, soluble polymer, or a fluffy, opaque, cross-linked, insoluble polymer known as "popcorn polymer," and commonly believed to be caused by the presence of peroxides. Both types of polymerization are objectionable, the popcorn polymerization being particularly so because it is self-propagating, traces of it causing the formation of additional popcorn polymer. When the aforementioned types of polymerization occur during the handling, storage, transportation, fractional distillation, etc., of the aforementioned monomers, it is often necessary to dis-assemble the equipment and mechanically remove the accumulations of polymer.

In the article by Kharasch et al., entitled, "Inhibition of Polymerization—Laboratory and Plant Control of Popcorn Polymer Growth," Industrial and Engineering Chemistry, volume 39, pages 830–837 (July 1947), the formation of popcorn polymer in the handling of butadiene and styrene is dealt with, and it is shown that a dilute aqueous solution of sodium nitrate is an effective agent for inhibiting popcorn polymer formation as well as the thermal polymerization of styrene.

The use of an aqueous solution of sodium nitrite or other nitrite salt has, however, only limited applicability to the problem of preventing undesired polymerization of polymerizable olefinically unsaturated monomers. Thus, an aqueous solution cannot be used in the fractionation of those monomers which are less volatile than water (e.g., vinyltoluene), because during the fractionation of such monomers the water is evaporated, causing separation of the solid nitrite which effectively stops the inhibiting action. Even in those cases where the aqueous solution of the nitrite is used with a low boiling monomer such as butadiene, the results are not entirely satisfactory. In such cases some water is lost by co-distillation with the monomer, which in turn leads to the separation of solid nitrite. In order to remove this deposit the distillation column must be periodically flushed with water. The aqueous sodium nitrite treatment is aso inapplicable with those monomers which react with water. An example of such a monomer is 2-chloro-butadiene-1,3 which is hydrolyzed by prolonged contact with water.

The principal object of our invention is to provide a method of inhibiting undesired polymerization of polymerizable olefinically unsaturated monomers, which is applicable to such monomers generally and is not restricted as are the prior art procedures. Another object is to provide a method which inhibits undesired polymerization of any type. Another object is to provide a method which is readily applicable to the prevention of undesired polymerization during the fractional distillation of polymerizable olefinically unsaturated monomers. Another object is to provide such a method which is applicable to such monomers while they are in storage or undergoing transportation. Another object is to provide a method which entails no special treatment to separate the inhibiting material from the monomeric material prior to use thereof, as in polymerization of the monomers to make synthetic rubber. Numerous other objects of our invention will more fully hereinafter appear.

Our invention is based upon our discovery that undesired polymerization of any type, whether of the type forming a clear, soluble polymer or of the type forming insoluble, cross-linked, popcorn polymer, can be readily inhibited in a simple and commercially feasible manner by maintaining the monomer, normally subject to such undesired polymerization, in contact with an inhibiting solution comprising a nitrite salt in a suitable inert, immiscible organic solvent. The term "organic solvent," as used here and elsewhere in the specification and claims, comprises single liquid organic compounds and liquid mixtures of organic compounds. Such a non-aqueous inhibiting solution of a nitrite salt in a suitable organic solvent, which remains at least in part as a separate phase from the monomer under the conditions to which the monomer is subjected, has been found to be surprisingly effective in inhibiting undesirable polymerization without suffering from the disadvantages and limitations of an aqueous solution, as outlined above.

Our invention is applicable to any of the polymerizable olefinically unsaturated monomers which are subject to undesired polymerization during fractional distillation, handling, storage, etc. Examples of monomers to which our invention is applicable are aliphatic conjugated diolefin hydrocarbons, especially butadiene and isoprene; halogen derivatives thereof such as 2-chloro-butadiene-1,3 (chloroprene), 2,3-dichloro-butadiene; styrene, and substituted styrenes such as vinyltoluenes, monochlorostyrenes, and dichloro-styrenes; vinylpyridines such as 2-methyl-5-vinylpyridine, 2-vinyl-5-ethylpyridine; etc.

The solvent used to dissolve the nitrite salt should preferably have certain characteristics, which are discussed in the following paragraphs.

(1) *Solubility of nitrite salt in solvent.*—We have found that, to accomplish the desired purpose of inhibiting polymerization of the monomer, the concentration of nitrite salt should preferably be at least about 0.1%, and in most cases, more preferably should be at least about 1%, based on the weight of the solvent. The solubility of the nitrite salt in the solvent should therefore preferably be at least 0.1% to 1% at the lowest temperature to which the inhibiting solution is subjected.

(2) *Reactivity of solvent.*—The solvent must be stable and must be substantially unreactive with the monomer or monomers present and with the nitrite at the highest temperature and concentration used.

(3) *Volatility of solvent.*—In applications which involve evaporation or distillation, the solvent used should be sufficiently less volatile than the monomer to insure against excessive loss of solvent by co-distillation with the monomer, which would result in contamination of the distillate and deposition of solid nitrite from the inhibiting solution. The boiling point of the solvent may be taken as a measure of its volatility. The required difference in boiling point between the solvent and the monomer will depend on the efficiency of the fractionating column used in the distillation, and on the degree of purity desired in the distillate. With a highly efficient fractionation column, a differential of 10° C. in the boiling points of the solvent and the monomer may be sufficient. In general, however, larger differentials, of the order of 50° C. and greater, are preferable.

(4) *Miscibility of solvent and monomer.*—The nitrite solution, and hence the solvent, must not be more than partially miscible with the monomer or monomer-containing material being protected against polymerization. In the preferred practice of our invention the solvent is substantially immiscible with the monomer-containing material.

Excessive miscibility of the monomer and the solvent is objectionable because of precipitation of the nitrite salt, due to solution of the monomer in the inhibiting solution and to extraction by the monomer of the solvent. Because of the many variables involved under the conditions of actual practice of our invention, it is impossible to fix a generally applicable numerical limit on the extent of miscibility between the solvent and the monomer. However, those skilled in the art will be readily able, in the light of this specification, to select a suitable solvent for use with a given monomer-containing material.

(5) *Acid-base characteristics of solvent.*—In certain instances, when handling polymerizable monomers of the type in question, one encounters development of an acidic condition for one reason or another. Should this acidic condition be undesirable, one can counteract it by including in the solvent a basic component to neutralize the acid. It is important, however, that the solvent be only weakly basic, i.e. less basic than monoethanolamine. Under no circumstances should the solvent be or become strongly acidic, since this would result in the formation of nitrous acid in appreciable concentration. These requirements may be expressed by the condition that the solvent, when dissolved in or shaken with water, should give a pH in the water solution of between 7 and 12, and preferably between 7 and 10.

The characteristics enumerated above are sufficient to determine whether a given solvent is suitable for use in the case of any given monomer under any given conditions of operation.

Examples of types of compound comprising some of the organic solvents suited for use in our invention, with individual compounds in each group so suited, include the following: glycols, such as ethylene glycol, propylene glycol, 1,5-pentanediol; glycol ethers, such as diethylene glycol, triethylene glycol; and other liquid members of the group of compounds known as polyalkylene glycols, derived from the condensation polymerization of the alkylene glycols; trihydroxy-substituted aliphatic hydrocarbons, such as glycerine, 1,2,6-trihydroxyhexane; alkyl-substituted phenols, such as diisopropylphenol; alkanolamines, such as diethanolamine, and diisopropanolamine; and polyhydroxy-substituted hydrocarbons, such as the liquid members of the group of compounds known as the polyvinyl alcohols. In the light of the preceding discussion, it is of course clear that the above list of suitable solvents is given for purposes of illustration only and not by way of limitation of our invention; that the particular solvent in any given case must be chosen with reference to the monomer, the nitrite, and the conditions of operation; and that mixtures of compounds, as well as single compounds, may be used as solvents.

Any stable salt of nitrous acid which is sufficiently soluble in a suitable high-boiling organic solvent can be used in the practice of our invention. Among such nitrites are the alkali metal nitrites, such as sodium, potassium, and lithium nitrites; the alkaline earth metal nitrites, such as calcium nitrite; and the tri- and tetra-organo-substituted ammonium nitrites, such as trimethylammonium nitrite, cyclohexyldimethylammonium nitrite, tetramethylammonium nitrite, and dodecyltrimethylammonium nitrite.

In that embodiment wherein our invention is applied during the fractional distillation of the monomer, the inhibiting liquid typically wets the entire interior surface of the fractionation column and forms a pool at the base of the column so as to permit withdrawal, if desired, of a separate phase of the inhibiting solution from the base. Typically there is also formed a mist of droplets of the inhibiting solution throughout the entire vapor space in the column in addition to coating the entire surface of the column.

In handling the monomer it is highly preferred, although not essential, that the entire surface of the equipment be coated with the inhibiting solution prior to introduction of the monomer or monomer-containing material into such equipment. This precaution is desirable in order to prevent any initial formation of polymer, especially popcorn polymer, before adequate circulation of the inhibiting solution can be achieved.

It is to be understood that our invention is applicable at any point during the manufacture, handling, storage, use, etc. of the monomer or material containing the same. For example, it can be applied to monomer being passed through pipes, monomer in surge tanks, etc. Our invention is also applicable during the recovery of unreacted monomers from the manufacture of synthetic rubber.

Perhaps the widest application of our invention is during the fractional distillation of materials comprising polymerizable olefinically unsaturated monomeric material to recover such monomeric material in a more highly purified form. In applying our invention to such fractional distillation, we feed a stream comprising the monomer into a fractional distillation column of the conventional type and subject it to fractional distillation therein with conventional re-boiling at the bottom of the column and withdrawal of over-head material, condensation thereof, and return of a portion of the condensed liquid to the top of the column as reflux. We continuously feed (preferably in the form of a spray) the inhibiting solution comprising a nitrite salt in an organic solvent of the character described into the upper portion of the column, typically above the top tray thereof, and allow it to descend therein. We re-circulate the nitrate solution by continuously withdrawing it from the lower portion of the column and introducing it into the upper portion of the column. We can separately withdraw from the bottom of the column a phase of a high-boiling fraction of the feed and a phase of the nitrite solution. Alternatively, we can withdraw these two phases in admixture, subject the withdrawn mixture to layer separation, draw off the separated layer of the nitrite solution, and reintroduce it into the top of the column.

In applying our invention to the fractional distillation of the feed stream containing the unsaturated monomer in question, in the manner just described, it may be necessary to maintain the concentration of the nitrite in the recirculated solution at the desired level by the addition of more nitrite in any suitable manner, due to the progressive loss of nitrite during use.

Another embodiment of our invention comprises its application to monomeric material in transit or in storage. For example, we can introduce our solution of a nitrite salt in an organic liquid into the upper portion of a tank car or a storage tank of the monomer to be protected against polymerization, circulate such inhibiting solution through the body of monomeric material in any suitable manner designed to secure adequate contact between the two phases, withdraw the layer of the inhibiting solution from the bottom of the tank car or storage tank, and reintroduce it into the top. Alternatively, we can effect the desired intimate contact between the inhibiting solution and the monomer phase in any other suitable manner, for example by passing the two liquids through any suitable liquid-liquid contacting apparatus or by agitation.

The following examples illustrate our invention more fully.

EXAMPLE 1

This example demonstrates the operability of the present invention with a high boiling monomer and the inoperability of an aqueous solution of sodium nitrite with the same monomer.

In a sealed tube there were placed 4 ml. of commercial vinyltoluene (containing approximately 1.4% of divinylbenzene) and 0.1 ml. of a 20% aqueous solution of sodium nitrite. The tube was sealed in air and incubated at 60° C. The material was completely converted to popcorn polymer at the end of 34 hours.

In a comparative experiment, performed in accordance with our invention, the 0.1 ml. of 20% aqueous solution of sodium nitrite was replaced with 0.1 ml. of a 10% solution of sodium nitrite in ethylene glycol. Upon sealing the tube and incubating at 60° C. as before, no polymer formation whatever was visible at the end of 210 hours. This example clearly shows the inapplicability of aqueous solutions of alkali metal nitrites with high-boiling monomers such as vinyltoluene.

EXAMPLES 2 TO 11

In these examples we used tubes 12 millimeters in diameter having a volume of 16 milliliters, charged with 4 milliliters of commercial vinyltoluene and the amount of nitrite solution specified in Table I below, and then sealed off in air. All tubes were incubated at 60° C. as before. The data are given in Table I.

periment is carried out under pressure sufficient to liquify the monomers, with equivalent results.

In a further series of experiments active popcorn polymer was added to the monomers. Even when this was done the striking beneficial effects of our inhibiting solutions were readily demonstrated.

Having thus described our invention, what we claim and desire to protect by Letters Patent is:

1. In that method of inhibiting undesirable polymerization of a polymerizable olefinically unsaturated monomer which comprises maintaining said monomer in contact with a nitrite salt, the improvement which comprises the step of supplying the nitrite salt in solution in an organic solvent selected from the group consisting of glycols, polyalkylene glycols, polyhydroxy-substituted hydrocarbons, alkanolamines having more than 2 carbon atoms in the alkylene group, and alkyl-substituted phenols.

2. The method of inhibiting undesirable polymerization of a polymerizable olefinically unsaturated monomer which comprises maintaining the monomer in contact with an inhibiting solution comprising a salt of nitrous acid selected from the group consisting of alkali metal nitrites, alkaline earth metal nitrites, and tri- and tetra-organo-substituted ammonium nitrites in an organic sol-

*Table I*

INHIBITION OF POPCORN POLYMER FORMATION IN VINYL-TOLUENE WITH NON-AQUEOUS SOLUTIONS OF SODIUM NITRITE AT 60° C.

| Example No. | Solvent for Sodium Nitrite | Percent Nitrite in Solvent | ml. Sol'n Used | Time in hrs. for viscosity change | Time in hrs. for 1st detection of popcorn | Hrs. for complete conversion to popcorn polymer |
|---|---|---|---|---|---|---|
| 1 | None (control) | None | None | Less than 10 | Less than 19 | Less than 19. |
| 2 | Diisopropyl phenol | 0.8 | 0.5 | | None at 115 | None at 115. |
| 3 | Isopropanol amine | 1.6 | 0.5 | None at 115 | do | Do. |
| 4 | do | 2.4 | 0.5 | do | do | Do. |
| 5 | Ethylene glycol | 5 | 0.5 | do | do | Do. |
| 6 | do | 10 | 0.2 | Over 83 | None at 154 | None at 154. |
| 7 | Propylene glycol | 2 | 0.5 | Over 39 | None at 182 | None at 182. |
| 8 | Diethylene glycol | 1.8 | 0.5 | do | do | Do. |
| 9 | Ethanol amine | 1.8 | 0.5 | 14 | 29 | 39. |
| 10 | Diethanol amine | 1.2 | 0.5 | 29 | None at 182 | None at 182. |
| 11 | 1,5-Pentane diol | 0.8 | 0.5 | 62 | do | Do. |

EXAMPLE 12

The commercial vinyltoluene used in the foregoing examples contained approximately 0.08% of dinitro-ortho-cresol as in inhibitor. In order to demonstrate that the presence of the dinitro-ortho-cresol has no effect upon the operability of our invention, the following pair of experiments was performed using vinyltoluene which had been highly purified by distillation. 1.4% of divinyl benzene was added to the purified monomer in order that it would be comparable to the commercial vinyltoluene of the preceding examples. The inhibiting solution was a 2.4% solution of sodium nitrite in isopropanolamine. The data are given in Table II below.

vent characterized by being: (1) incompletely miscible with the monomer; (2) higher boiling than the monomer; (3) less basic than monoethanolamine in aqueous solution; (4) unreactive with the monomer, selected from the group consisting of glycols, polyalkylene glycols, polyhydroxy-substituted hydrocarbons, alkanolamines having more than two carbon atoms in the alkylene group, and alkyl-substituted phenols.

3. The method of claim 2 in which the monomer is vinyltoluene.

4. The method of claim 2 in which the monomer is 2-chlorobutadiene-1,3.

*Table II*

| Example No. | Solvent for Sodium Nitrite | Percent Nitrite in Solvent | ml. sol'n Used | Time in hrs. for viscosity change | Time in hrs. for 1st detection of popcorn | Hrs. for complete conversion to popcorn polymer |
|---|---|---|---|---|---|---|
| 12 | None (control) | None | None | Less than 10 | Less than 19 | Less than 19. |
|    | Isopropanolamine | 2.4 | 0.5 | No change at 115 | No change at 115 | No change at 115. |

Experiments similar to those described above have been carried out with styrene, butadiene-1,3, chloroprene, etc. Our inhibiting solutions were equally effective with these monomers. In the case of styrene and other monomers that are normally liquids the procedure may be precisely as outlined in the foregoing examples, with equivalent results. In the case of butadiene and other normally gaseous monomers, the procedure may be precisely the same as in the foregoing examples, except that the ex- 5. The method of claim 2 in which the monomer is butadiene-1,3.

6. The method of claim 2 in which the monomer is styrene.

7. The method of claim 2 in which the solution is a solution of sodium nitrite in diethylene glycol.

8. The method of claim 2 in which the solution is a solution of sodium nitrite in ethylene glycol.

9. The method of claim 2 in which the solution is a solution of sodium nitrite in diethanolamine.

10. The method of claim 2 in which the solution is a solution of sodium nitrite in isopropanolamine.

11. The method of inhibiting undesired polymerization during the fractional distillation of a polymerizable olefinically unsaturated monomer which comprises feeding a stream comprising said monomer into a fractional distillation column and subjecting it to fractional distillation therein, removing a fraction enriched in said monomer from said column, continuously feeding an inhibiting solution comprising a nitrite salt in an organic solvent that is incompletely miscible with the monomer, that has a higher boiling point than the monomer, and that is unreactive with the monomer into the upper portion of said column and allowing said inhibiting solution to descend therein, and recirculating said solution, by continuously withdrawing said solution from the lower portion of said column and introducing the withdrawn solution into the upper portion of said column, said solvent being selected from the group consisting of glycols, polyalkylene glycols, polyhydroxy-substituted hydrocarbons, alkanolamines having more than 2 carbon atoms in the alkylene group, and alkyl-substituted phenols.

12. The method of inhibiting undesired polymerization of a body of a polymerizable olefinically unsaturated monomer in storage or transit which comprises introducing into said body an inhibiting solution comprising a nitrite salt in an organic solvent that is incompletely miscible with the monomer, that has a higher boiling point than the monomer, and that is unreactive with the monomer, contacting said body with said inhibiting solution, continuously withdrawing said solution from said body after it has contacted same, and continuously introducing the withdrawn solution into said body, said solvent being selected from the group consisting of glycols, polyalkylene glycols, polyhydroxy-substituted hydrocarbons, alkanolamines having more than 2 carbon atoms in the alkylene group, and alkyl-substituted phenols.

References Cited in the file of this patent

UNITED STATES PATENTS

| | | |
|---|---|---|
| 2,361,538 | Franz | Oct. 31, 1944 |
| 2,388,041 | Craig | Oct. 30, 1945 |
| 2,527,916 | Churchill | Oct. 31, 1950 |
| 2,631,175 | Johnstone et al. | Oct. 7, 1952 |
| 2,715,103 | Nelson | Aug. 9, 1955 |
| 2,730,489 | Lewis | Jan. 10, 1956 |
| 2,741,583 | Vaughan et al. | Apr. 10, 1956 |
| 2,770,657 | Hively | Nov. 13, 1956 |

OTHER REFERENCES

Kharasch et al.: Industrial and Engineering Chemistry, vol. 39, pp. 830, 837 (July 1947).